Nov. 14, 1933.    R. W. JOHNSON    1,934,981
INDUCTION MOTOR
Filed Feb. 5, 1932    2 Sheets-Sheet 1

INVENTOR.
Roy N. Johnson
BY
Bottum, Hudnall, Lesher, McNamara & Michael
ATTORNEYS Nov. 14, 1933.  R. W. JOHNSON  1,934,981
INDUCTION MOTOR
Filed Feb. 5, 1932  2 Sheets-Sheet 2
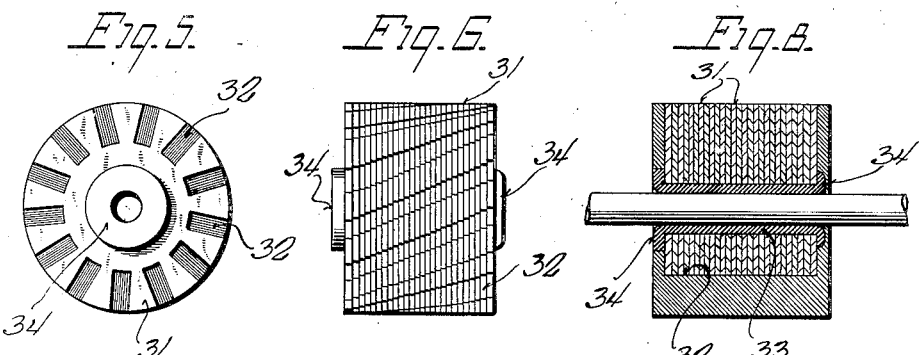
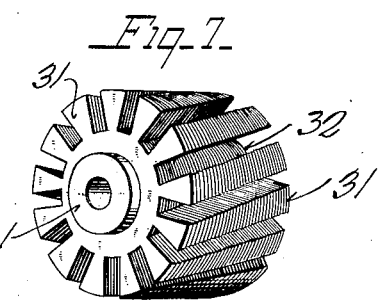
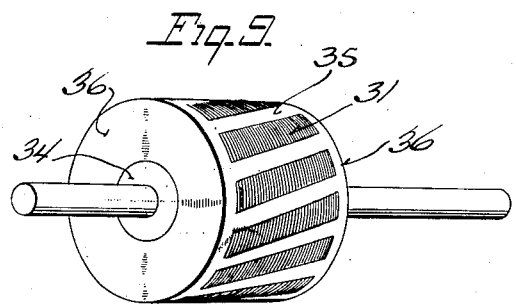
INVENTOR.
Roy N. Johnson
BY
ATTORNEYS Patented Nov. 14, 1933

1,934,981

UNITED STATES PATENT OFFICE 1,934,981

INDUCTION MOTOR

Roy W. Johnson, Milwaukee, Wis.

Application February 5, 1932. Serial No. 591,018

4 Claims. (Cl. 172—278)

This invention relates to an improvement in induction motors of the small type utilized, for example, for operating furnace damper controls although also capable of other uses and applications.

In its general construction, the motor embodying the present invention is conventional and the inventive features peculiar thereto deal generally with the structure of the laminated core of the field, with the manner of locating the side plates which are secured to the field and carry the bearings supporting the rotor and with the structure of the rotor.

In the core as proposed by the present invention, the U-shaped laminations are split or severed at the juncture of one leg with the body portion and in the assembly alternate laminations are reversed so that the splits are staggered. This has the advantage of enhancing the rigidity of the structure and of providing a better path for the magnetic flux.

The second novel feature resides in the provision of centering bosses or lugs on the side plates, which bosses coact with recesses in the laminated core of the field to accurately line up the side plates and the field structure. Inasmuch as the side plates carry the bearings for the rotor, the rotor is properly related to the field and a uniform air gap, so important for efficient operation in this type of motor, is had between the periphery of the rotor and the curved faces of the field poles.

The rotor proposed by the present invention comprises the usual notched iron discs assembled in face to face relation with the notches registering to provide parallel grooves. However, these iron discs are held assembled and properly related by means of a sleeve or bushing passing through the alined central apertures of the discs and having its ends swaged or pressed over into secure and binding clamping engagement with the end discs. The induction bars and their connecting end plates are die cast into the structure as thus constituted so that they are formed of one single, integral and continuous piece of copper. After the die casting the surfaces of the rotor are machined down for purposes of smoothing and finishing. The interior of the bushing is accurately machined to properly fit the rotor shaft.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 5 is a view in end elevation showing the rotor as constructed just prior to the die casting of the copper;

Figure 6 is a view in side elevation showing the rotor partially constructed and as illustrated in Figure 5;

Figure 7 is a perspective view further showing the rotor as thus constructed;

Figure 8 is a view in longitudinal section showing the rotor as the die casting and finishing operations; and Figure 9 is a perspective view showing the rotor as completely constructed and mounted on its shaft.

Figure 1:
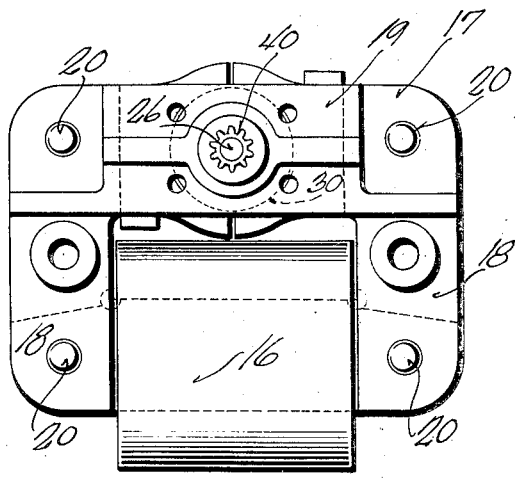
Figure 1 is a view in side elevation showing an induction motor embodying the present invention.

Referring to the drawings, it will be seen that the induction motor embodying the present invention comprises a stator or field member designated generally at 10 and having a core made up of a plurality of thin iron plates or laminations assembled in face to face relation. Each lamination is approximately U-shaped in that it includes a body portion 11 and legs or side members 12. At the juncture of one of the legs 12 and body portion 11 each lamination is split as at 13. When the laminations are assembled alternate laminations are reversed so that the splits are staggered as will be understood from a comparison of the full and dotted lines in Figure 3. The legs 12 are provided with extensions 14 which extend toward each other and are shaped to provide the pole faces of the field. A shading coil 15 is provided on each extension 14. The action of shading coils is well known and for the purposes of the present application it is sufficient to consider that the currents induced in the shading coil set up a magnetic field opposed to the magnetic flux which induced currents in the shading coil. The development of the magnetic flux to its maximum value in that portion of the pole tip enclosed by the shading coil is retarded and there is a time lag between the development of such flux to its maximum value and the time in which the flux in the unshaded portion of the pole reaches its maximum value. There is in effect a shifting of the flux axis from the unshaded to the shaded portion of the pole tip and this shifting of the flux simulates the rotating magnetic field present in a polyphase motor with the result that the rotor is set in motion in a direction from the unshaded toward the shaded portion of the pole. The field winding shown diagrammatically and designated at 16 are wound about the body portion 11 of the core. A pair of U-shaped side plates 17 are provided and have their legs 18 covering the legs 12 of the core and their body portions 19 extending across the space between the poles. The side plates are securely held assembled with the laminations, and the laminations are also securely held assembled by means of rivets 20.

Figure 2:
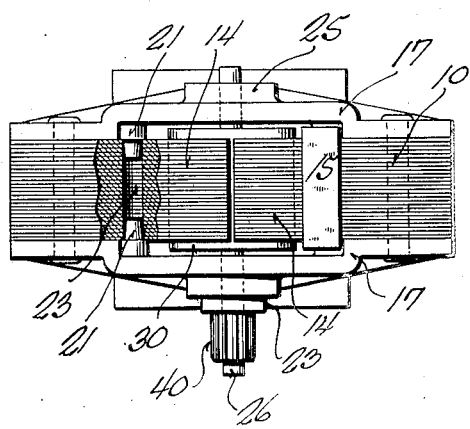
Figure 2 is a view in top plan of the motor shown in Figure 1 with portions of the core broken away to show two of the centering bosses.
Figure 3:
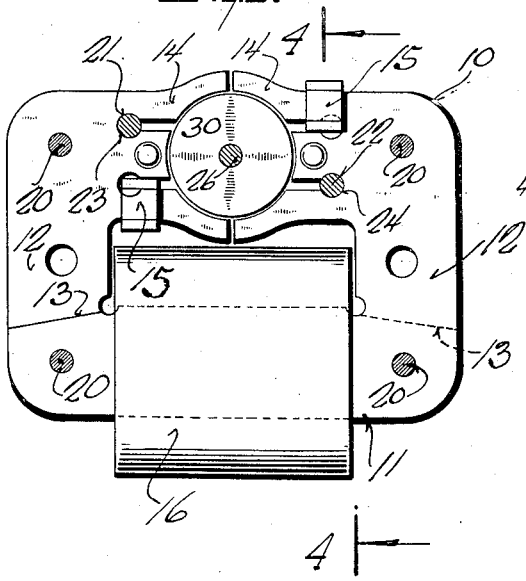
Figure 3 is a view similar to Figure 1, the side plate, however, being omitted to show the construction of the laminated core of the field.
Figure 4:
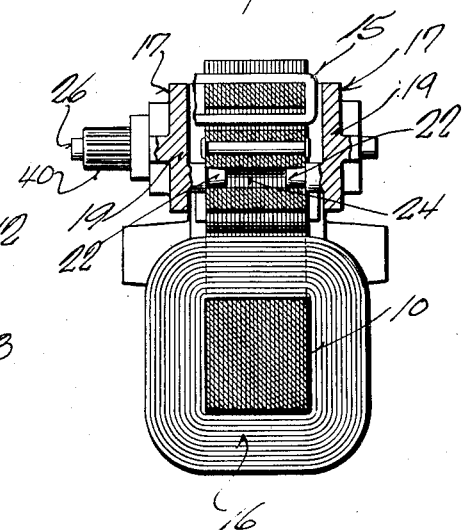
Figure 4 is a view in section taken on line 4—4 of Figure 3.

For the purpose of accurately lining up the side plates and the field structure pairs of centering bosses designated at 21 and 22 are provided and interfitted with recesses 23 and 24 provided in the laminations as clearly shown in Figures 2, 3 and 4. There is a centering boss 22 on each side plate and the centering bosses 21 and 22 of one side plate are opposed to and alined with the centering bosses 21 and 22 of the other side plate. The side plates are cast with the centering bosses accurately located thereon and the recesses 23 and 24 are accurately punched. The side plates 17 are provided with bearings 25 for the rotor shaft 26 and inasmuch as these plates are very accurately located with respect to the pole faces a uniform air gap will be had between the periphery of the rotor designated at 30 and the pole faces.

The rotor 30 comprises a plurality of the usual notched iron discs designated at 31 and assembled in face to face relation with the notches registering to provide parallel grooves 32, as will be clear from Figures 5 to 9, inclusive. The iron discs are held assembled and properly related in the early stages of the rotor construction or manufacture by means of a bushing 33 which has its ends 34 bent or pressed over into secure and binding clamping engagement with the end discs. The induction bars designated at 35 and the copper end plates 36 which electrically connect these induction bars are die cast into the structure as constituted at that stage of its manufacture shown in Figure 8, that is, where the rotor is completed to the extent that it has the iron discs properly assembled and related and held together by the bushing 33. After the die casting the surfaces of the rotor are machined down to produce a rotor such as shown in Figure 9. The rotor is assembled with the side plates prior to the time when these plates are riveted to the core. A pinion 40 may be appropriately secured to the portion of the shaft 26 which projects beyond one of the bars 25.

The motors constructed in accordance with the present invention are not only compact and simple in their structure but are rugged, strong and durable. They are efficient in operation and are capable of developing the torque required for their intended uses.

While I have shown and described one type of construction embodying my invention it is to be understood that the construction shown and described has been selected merely for the purposes of illustration and that various changes in the size, shape, form and arrangement of the parts may be made without departing from the spirit of the invention or the scope of the subjoined claims.

The invention claimed is:
1. A motor of the character described comprising a field member having a laminated core formed with pole faces, a rotor in cooperative relation to the pole faces, side plates having bearings for supporting the rotor for rotation, inwardly extending centering bosses integral with the side plates, said laminations having centering openings in which said bosses fit to properly relate the side plates and laminations and to so dispose the bearings that a uniform air gap will be had between the rotor and the faces of the poles and means for securing the side plates and laminations assembled.

2. An induction motor of the character described comprising a field member consisting of a plurality of laminations assembled in face to face relation, said laminations being approximately U-shape and having extensions on their legs formed to constitute the poles of the field member, a field winding on the body portion of the laminations, side plates of U-shape and having their legs overlapping the legs of the field member and their body portions extending across the space between the poles and provided with bearings, said body portion and said legs being of integral one-piece construction a rotor having a shaft rotatably mounted in the bearings of the side plates, inter-engaging centering means between the side plates and the laminations for properly relating the side plates and laminations and so disposing the bearings of the side plates that a uniform air gap will be had between the rotor and the faces of the poles, and means for securing the side plates to the laminations and for holding the laminations in assembly.

3. An induction motor of the character described comprising a field member consisting of a plurality of laminations assembled in face to face relation, said laminations being approximately U-shaped and having extensions on their legs formed to constitute the poles of the field member, a field winding on the body portion of the laminations, side plates of U-shape and having their legs overlapping the legs of the field member and their body portions extending across the space between the poles and provided with poles, a rotor having a shaft rotatably mounted in the bearings of the side plates, centering bosses on the side plates, recesses in the laminations in which the centering bosses interfit whereby the parts will be properly related to provide a uniform air gap and means for securing the side plates and laminations assembled.

4. An induction motor having a field member, and a rotor cooperable with the field member and consisting of notched iron discs assembled in face to face relation and centrally apertured, a bushing extending through the central apertures and having its ends engaged with the end discs to hold the discs assembled, and induction bars die cast in the notches of the discs.

ROY W. JOHNSON.